No. 844,542. PATENTED FEB. 19, 1907.
L. B. SCHENCK.
INCASED RECEPTACLE.
APPLICATION FILED OCT. 11, 1906.
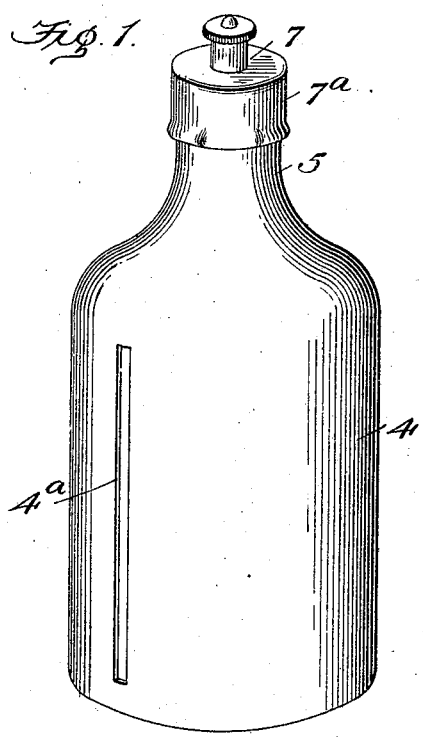
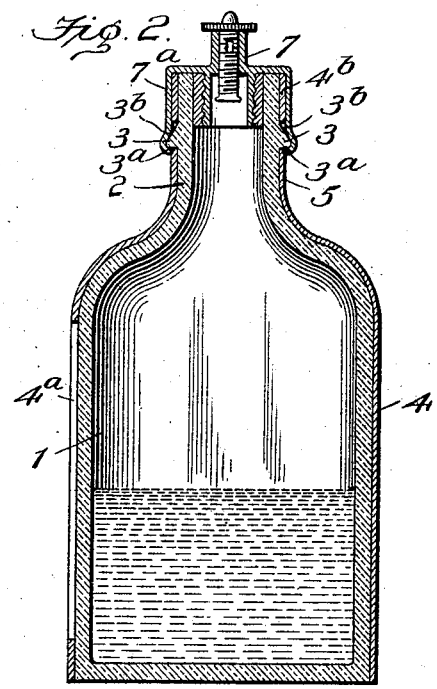
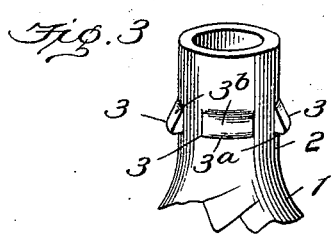
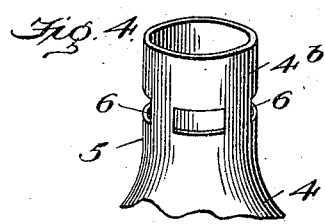
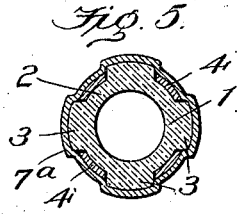
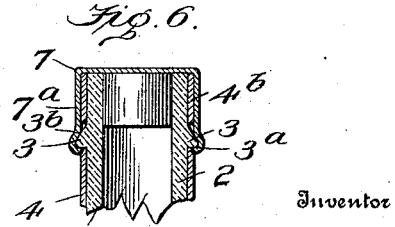
Witnesses
Edwin L. Bradford
Inventor
Ludwig B. Schenck
By F. W. Ritter Jr.
Attorney
THE NORRIS PETERS CO., WASHINGTON, D. C.

UNITED STATES PATENT OFFICE.

LUDWIG B. SCHENCK, OF NEW YORK, N. Y.

INCASED RECEPTACLE.

No. 844,542.  Specification of Letters Patent.  Patented Feb. 19, 1907.

Application filed October 11, 1906. Serial No. 338,421.

*To all whom it may concern:*

Be it known that I, LUDWIG B. SCHENCK, a subject of the Emperor of Germany, residing at New York, in the county of New York, and State of New York, have invented certain new and useful Improvements in Incased Receptacles; and I do hereby declare the following to be a full, clear, and exact description of the invention, such as will enable others skilled in the art to which it appertains to make and use the same.

My invention relates to the construction of bottles, jars, or other receptacles, to a protecting casing or hood therefor and the manner of attaching said casing or hood to the receptacle, and to a closure for the receptacle and the manner of securing the same to the receptacle and casing.

It is the object of this invention to provide an inexpensive, simple, and easily assembled device of such a character that the contents of the incased receptacle cannot be readily tampered with without the mutilation and practical destruction of the package, and while the use of a hood or casing has obvious advantages when the incased receptacle is composed of easily-frangible material, such as glass or pottery, yet in addition to affording a protection against breaking the casing serves also as a deterrent against alteration of the contents of said incased receptacle, as such case may be so constructed and of such material that it is easily damaged through any attempt to remove the receptacle-closure after the latter has been once applied. As the said hood or casing may be formed of material upon which advertising matter may be readily printed or embossed it is a further object of my invention to provide simple means for efficiently attaching the casing to the incased receptacle independently of the form of receptacle-closure employed, since it may be often desirable to employ the hood or casing in connection with a bottle having a stopper of ordinary form.

To accomplish the several objects before noted, I combine with a receptacle an incasing hood and a closure for the receptacle, said receptacle and the hood or case being provided with interlocking means for preventing their disassociation after having been brought into proper relation with each other and said closure engaging the case or hood and also the hood-locking means of the receptacle, and such a construction embodies the main feature of my invention.

There are other minor features of invention, residing in particular combinations and elemental construction, all as will hereinafter more fully appear.

In the drawings chosen for the purpose of illustrating this invention, the scope whereof is pointed out in the claims, Figure 1 is a perspective view of a bottle, hood, and closure embodying my invention. Fig. 2 is a vertical longitudinal section of the construction shown in Fig. 1. Fig. 3 is a perspective view of the neck portion of the bottle, illustrating the preferred form thereof. Fig. 4 is a perspective view of the neck portion of an incasing hood which is adapted for use with the bottle shown. Fig. 5 is a horizontal section of the construction shown in Fig. 2, taken in the plane of the hood-engaging lugs of the bottle there illustrated. Fig. 6 is a vertical central section of the neck portions of the bottle and hood shown in Fig. 2, but illustrating a modified form of closure for the bottle.

Like symbols refer to like parts wherever they occur.

I will now proceed to describe my invention more fully, so that others skilled in the art to which it appertains may apply the same.

In the drawings, 1 is a receptacle, in the present instance represented as a bottle one end of which is molded smaller than the other to form the neck 2. The bottle 1 is provided with means which engage the incasing hood to prevent its disassociation from the bottle after having been brought into proper relation therewith, said means being preferably formed upon the neck of the bottle and integral therewith. For this purpose there is preferably formed upon the neck 2 as an integral part thereof an annular bead, which is preferably interrupted at intervals to form a series of lugs 3; but, if desired, the bottle-neck may be formed with only one such lug. The lugs 3 are formed so that they each have one face $3^a$ projecting outwardly from the exterior of the bottle-neck 2 to form an abutment, which prevents the disassociation of the receptacle 1 and hood 4 after the said receptacle and hood have been brought into proper relation, the other faces 3ᵇ of the said lugs being preferably inclined to more readily permit the hood 4 to be slipped over the receptacle.

Incasing the receptacle 1 is a hood 4, which is formed in a single piece and which is preferably open at both ends, as shown. This hood may be made of any material which is sufficiently resilient to permit it to be forced over the lugs 3 of the bottle-neck, as will be presently described; but it is preferred to form said hood of compressed paper-pulp or other compressed fibrous material, for when the hood is made from material such as this it offers an excellent protection against breakage of a frangible receptacle when such is employed and also since the hood thus formed is not highly elastic renders it impossible to remove the hood from the bottle without tearing or mutilating the former.

It is preferred that the hood should correspond in configuration to the bottle or other receptacle, so that it will form a closely-fitting casing therefor; but this may be otherwise, if desired, it being only necessary that the said hood should closely fit the receptacle adjacent to the hood-engaging means with which the latter is provided. The hood 4 may be provided with a sight-opening, such as 4ᵃ, if desired.

That portion of the hood 4 which is adjacent to the hood-retaining faces 3ᵃ of the lugs 3 fits the enveloped receptacle closely, in the present instance being contracted to form the neck 5. The neck 5 of the hood is preferably extended to the full height of the receptacle in order to permit slots 6 for the reception of the lugs 3 to be formed therein and also to present a packing-ring 4ᵇ between the bottle and its closure, such packing-ring preventing leakage and also serving as a filler between the neck of the bottle and the depending flange 7ᵃ of the bottle-closure 7.

7 is the closure for the receptacle, and while it is illustrated in Fig. 6 as a simple cap which is crimped under the lugs 3 of the bottle, yet it is preferred to construct such closure as a sprinkler of the form illustrated or any other usual or well-known construction serving the same purpose. This closure 7 is provided with an annular depending flange 7ᵃ, which extends downwardly a sufficient distance to be crimped or turned under the lugs 3 of the receptacle and is preferably forced slightly into the hood. It is also preferred to firmly press the flange 7ᵃ of the closure against the packing-ring 4ᵇ and against the portions of the hood which lie between the perforations or slots 6 thereof.

The construction being substantially such as hereinbefore pointed out, the device will be assembled by inserting the receptacle 1 within the hood 4 through the open bottom of the latter until the openings 6 in the said hood spring over the lugs 3 formed on the neck 2 of the receptacle. The closure 7 may now be applied to the mouth of the receptacle, pressed firmly against the contacting portion of the said hood, and crimped or bent under the lugs 3, as heretofore described, the hood, it will be observed, being thus secured to the receptacle both independently of and by means of the closure 7.

Having thus described my invention, what I claim, and desire to secure by Letters Patent, is—

1. A device of the character indicated, comprising a receptacle, a closure for said receptacle, and a hood for said receptacle, said hood being retained on said receptacle by means of said closure.

2. A device of the character indicated, comprising a receptacle, a unitary hood therefor, and a closure for said receptacle, said hood being secured to said receptacle both independently of and by means of said closure.

3. A device of the character indicated, comprising a receptacle provided with a plurality of lugs, and a hood having a plurality of apertures adapted to receive said lugs.

4. A device of the character indicated, comprising a receptacle provided with a plurality of lugs, a hood having a plurality of apertures adapted to receive said lugs, and a closure for the receptacle engaging said lugs and said hood.

5. A device of the character indicated, comprising a receptacle provided with a lug having an inclined face, and a unitary hood having a portion which closely fits the said receptacle adjacent to said lug, whereby the said hood is retained in position by said lug.

6. A device of the character indicated, comprising a receptacle, a hood therefor, and a closure for the said receptacle, said hood and said receptacle being provided with interlocking means which prevent their disassociation after having been brought into proper relation with each other, and said hood having a portion forming a packing-ring which is interposed between the said receptacle and its closure.

7. A device of the character indicated, comprising a receptacle provided with means for preventing the removal of an incasing hood, an incasing hood which is adapted to engage the hood-retaining means with which the receptacle is provided, and a closure which is affixed to said receptacle through the hood-retaining means thereof.

8. A device of the character indicated, comprising a receptacle provided with a plurality of lugs each of which has an inclined face to permit the passage of a hood in one direction and a face extending across the path of said hood to prevent the movement of the latter in an opposite direction, a hood having a plurality of apertures to receive said lugs, and a closure for said receptacle having a depending portion which engages said hood and said lugs.

9. A device of the character indicated, comprising a receptacle, a hood incasing said receptacle, and a closure for said receptacle, said hood having a packing-ring portion interposed between the said closure and the said receptacle.

In testimony whereof I affix my signature in presence of two subscribing witnesses.

LUDWIG B. SCHENCK.

Witnesses:
    Fatz W. Hawinghaus,
    Arthur W. Jowett